(12) United States Patent
Mekiska

(10) Patent No.: US 9,812,226 B2
(45) Date of Patent: Nov. 7, 2017

(54) ARRANGEMENT AND METHOD FOR PROVIDING AN EMERGENCY SUPPLY TO A NUCLEAR INSTALLATION

(75) Inventor: Frank Mekiska, Hanau (DE)

(73) Assignee: 123-Engineering & Innovation GmbH, Hanau (DE)

( * ) Notice: Subject to any disclaimer, the term of this patent is extended or adjusted under 35 U.S.C. 154(b) by 473 days.

(21) Appl. No.: 14/123,239

(22) PCT Filed: May 30, 2012

(86) PCT No.: PCT/EP2012/060116
§ 371 (c)(1),
(2), (4) Date: Dec. 2, 2013

(87) PCT Pub. No.: WO2012/163952
PCT Pub. Date: Dec. 6, 2012

(65) Prior Publication Data
US 2014/0093025 A1    Apr. 3, 2014

(30) Foreign Application Priority Data
May 31, 2011  (DE) .......................... 10 2011 050 744

(51) Int. Cl.
*G21D 1/02*     (2006.01)
*G21C 15/18*    (2006.01)
(Continued)

(52) U.S. Cl.
CPC ............ *G21C 15/182* (2013.01); *G21D 1/02* (2013.01); *G21D 1/04* (2013.01); *G21D 3/06* (2013.01); *F02B 63/04* (2013.01); *Y02E 30/40* (2013.01)

(58) Field of Classification Search
CPC ... G21D 1/02; G21D 1/04; G21D 3/06; G21C 15/182
(Continued)

(56) References Cited

U.S. PATENT DOCUMENTS 4,992,669 A * 2/1991 Parmley .................... F01B 1/12
                                                    123/2
2001/0032032 A1* 10/2001 Matsumoto ........... B60P 1/6445
                                                    700/213
(Continued)

FOREIGN PATENT DOCUMENTS

CN        101796681 A    8/2010
DE        2200851 A1     7/1973
(Continued)

OTHER PUBLICATIONS

Smith, "Review of International Activities in Accident Management and Decision Making in the Nuclear Industry", MIT-NED-EDF—Jan. 1999, May 1999, pp. 1-36.*
(Continued)

*Primary Examiner* — Jack W Keith
*Assistant Examiner* — Daniel Wasil
(74) *Attorney, Agent, or Firm* — Ladas & Parry LLP

(57) ABSTRACT

A method of providing an emergency supply of services to a nuclear power plant having a cooling water cycle, the method including:
   situating a container at a remote location from the power plant, wherein the container has permanently integrated therein:
   a motor comprising a first shaft and a second shaft;
   a generator driven by the first shaft;
   a pump driven by the second shaft;
   a fuel tank connected to the motor, and supplying fuel to the motor; and
   a transformer connected to the generator;
   connecting the pump to the cooling water cycle of the nuclear power plant;
   using the pump to pump water from an external water feed into the cooling water cycle of the nuclear power plant.

18 Claims, 6 Drawing Sheets

(51) Int. Cl.
  *G21D 1/04* (2006.01)
  *G21D 3/06* (2006.01)
  *F02B 63/04* (2006.01)

(58) Field of Classification Search
  USPC .................................................. 376/282, 277
  See application file for complete search history.

(56) References Cited

U.S. PATENT DOCUMENTS

| | | | |
|---|---|---|---|
| 2008/0217443 A1* | 9/2008 | Zacherl | F04D 15/0066 239/722 |
| 2008/0317193 A1 | 12/2008 | Sato | |
| 2009/0222984 A1 | 9/2009 | Gray | |
| 2010/0044369 A1* | 2/2010 | Toepfer | B60P 3/14 220/1.5 |
| 2010/0192908 A1 | 8/2010 | Hunter | |

FOREIGN PATENT DOCUMENTS

| | | | |
|---|---|---|---|
| DE | 20309849 U | 3/2004 | |
| EP | 1609508 * | 12/2005 | ............. B62D 33/04 |
| JP | 08-082221 A | 3/1996 | |
| JP | 8248167 A | 9/1996 | |
| JP | 2002-221592 A | 8/2002 | |
| JP | 2008-026023 A | 2/2008 | |
| JP | 2010-101144 A | 5/2010 | |
| WO | 2010/090634 A1 | 8/2010 | |

OTHER PUBLICATIONS

Al-Kusayer, "Availability of the Emergency Core Cooling System of a CANDU Pressurized Heavy-Water Reactor Following a Small Loss-of-Coolant Accident", Nuclear Technology, vol. 69, Jun. 1985, pp. 293-307.*
International Search Report dated Sep. 19, 2012, corresponding to PCT/EP2012/060116.
International Preliminary Report on Patentability (in German) dated Sep. 3, 2013, corresponding to PCT/EP2012/060116.
Non-English Office Action dated Jun. 8, 2016, for Japanese Application No. 2014-513171.
J-PlatPat English abstract of JP 08-082221 A.
J-PlatPat English abstract of JP 2010-101144 A.
J-PlatPat English abstract of JP 2002-221592 A.
J-PlatPat English abstract of JP 2008-026023 A.
Japanese Office Action dated Mar. 15, 2017 for Japanese Application No. 2014-513171 with English translation.
Chinese Office Action dated Apr. 19, 2017 for Chinese Application No. 201610385572.5.
Smith, C., et al., "Review of International Activities in Accident Management and Decision Making in the Nuclear Industry", Massachusetts Institute of Technology, MIT-NED-EDF, May 1999, pp. 1-32.

* cited by examiner

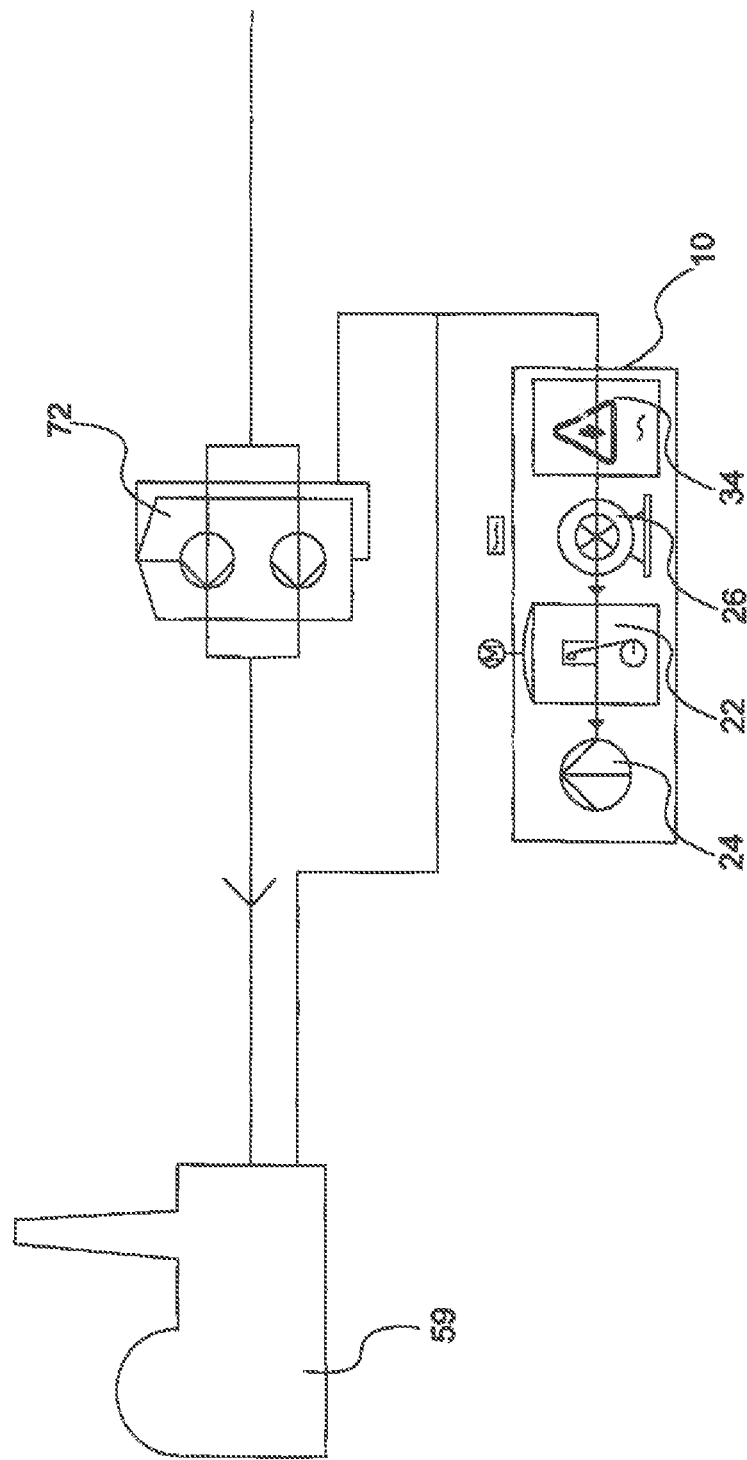

ARRANGEMENT AND METHOD FOR PROVIDING AN EMERGENCY SUPPLY TO A NUCLEAR INSTALLATION

This application is a 371 of PCT/EP2012/060116, filed on May 30, 2012, which claims priority to German Application No. 10 2011 050 744.2, filed May 31, 2011.

The invention relates to an arrangement for providing an emergency supply to a nuclear installation, with a container with several integrated facilities, comprising at least one motor, one generator, one pump, one fuel tank, as well as one transformer, whereby the pump and the generator are functionally connected to the motor to actuate said pump and generator. The invention further relates to a method for providing an emergency supply to a nuclear installation, using a pump and/or a generator that is/are independent of the nuclear installation.

Nuclear installations such as nuclear power plants can represent a significant risk for the environment in case of accidents that may develop as a result of for example earthquakes, acts of sabotage, attack, or other influences. In the event of incidents it has been noted that neither the plant operators, the civil disaster management services, nor fire brigades or disaster relief teams can handle a complete failure of the cooling systems in a nuclear power plant, if supply facilities, such as pump houses, have suffered mechanical destruction, for example as a result of earthquakes or flooding. Risks of this nature also arise in cases of power outages or operating errors, as was demonstrated in the Chernobyl accident.

A power-supplying device to be used in the field of chemical accident control, after ship accidents or in offshore regions, in accordance with DE 197 39 138 A1 possesses a container-like housing, in which are provided a motor, a hydraulic pump, a fuel tank, as well as a generator. The pump and the generator are functionally connected to the motor for the purpose of operating the pump and the generator.

WO 2010/090634 A1 relates to an energy-supply arrangement of modular design, with exterior walls to which can be mounted fuel tanks.

The subject matter of U.S. Pat. No. 4,992,669 A also is a modular energy system that comprises two containers, whereby a motor is disposed in one of the containers and a generator in the other container. The motor and the generator are connected by a shaft that passes through the container walls.

US 2008/0217443 A1 discloses a vehicle, with a pump, a motor, a generator, and a transformer arranged in the vehicle's cabin.

US-2001/0032032 discloses a mobile power-supplying arrangement, which comprises a container-like cabin, in which are arranged a drive unit and a generator. Additionally provided may be a cooling-water tank, which is fillable from the exterior via a connecting sleeve.

DE-10 2007 009 393 A1 relates to a mobile container module for military and/or humanitarian deployments.

The subject matter of JP-8-248167 A is a reactor emergency shutdown system.

The present invention is based on the objective to provide an arrangement and a method for providing an emergency supply to a nuclear installation so that in case of an accident it can be ensured that a self-contained system that is independent of the nuclear installation can maintain operations to such a degree that hazards to the environment are minimized.

It should also be ensured that the container can be transported and positioned in a stable position.

To meet its objective, the invention essentially provides an arrangement for providing an emergency supply to a nuclear installation, with a container with several integral facilities, comprising at least
  a motor,
  a generator,
  a pump,
  a fuel tank,
  a transformer,
  and possibly a decontamination area,
whereby the pump and the generator are functionally connected to the motor for the purpose of actuating the motor, and is characterized in that the fuel tank is arranged in the area of the center of gravity of the container.

The method of the invention is characterized by the use of a supply container with several integral facilities, comprising at least
  a motor,
  a generator,
  a pump,
  a fuel tank,
  a transformer,
  and possibly a decontamination area,
whereby the pump is integrated into the cooling water cycle of the nuclear pump, and/or the pump delivers cooling water from an external water feed into a cooling water cycle, or sections thereof, of the nuclear installation.

Even though containers with power generation units are known in the state of technology (DE 203 09 849 U), these are not stand-alone systems.

The same is true for the case of containers being used as house cells (DE 22 00 851 A1). In contrast, the invention makes available a self-sustaining system.

After a failure of the cooling system in a nuclear installation—be that by a power failure or by at least partial destruction of the piping network, the invention's teaching provides the option to re-vitalize the cooling-system or to bypass and consequently replace it.

The invention's teaching offers an emergency supply system that is independent from the nuclear installation, so that a targeted application of the supply container embodied in accordance with the invention allows re-establishing the necessary cooling within predefined time periods, so that the heat of radioactive decay can be dissipated safely. Offered is a mobile system that is immediately ready to function and to be used at the site of deployment.

The central piece of the supply container is a motor, in particular embodied as a high-performance turbo-charged Diesel motor, which can be operated on liquid petrochemical fuels or vegetable oils.

The motor possesses two shaft ends, with a pump connected to one end, whereby a clutched transmission allows a gentle start-up and adjustments of the pump speed. The pump can replace failed pumps of the cooling system of the nuclear installation.

Connected to the other shaft end is a generator for power generation. The power is delivered to a transformer or transformer control station integrated in the container to be transformed to the required rated power values.

The generated power can be used as replacement of the failed power supply grid in the nuclear installation, in order to re-activate, for example, pumps that are out of service but are still intact.

For the purpose of creating an autonomous system, the supply container further comprises an integrated tank to accommodate fuel. The holding capacity of the installed and buffered tank, e.g. a steel tank, should be at least 10 m³, in particular 15 m³. The tank can be subdivided into relaxation zones by partition plates, so that a build-up of oscillations of the contents is prevented during transport.

Given a large holding capacity of the tank of 15 m³ and a fuel consumption of the motor of for example 135 l/h, the system can run in stand-alone operation for 108 h, i.e. 4.5 days.

As a further development it is intended that in addition to the supply container as first container an additional second container may be employed, which also can contain a fuel tank. Moreover, the second container may contain built-in elements for accommodating installation materials or other components that are required to maintain the nuclear installation.

The pump is in particular embodied as a horizontally mounted self-priming spiral casing pump that is designed to operate with wastewater. The pump is connected via a gearbox to one of the motor shaft ends of the motor and operates without possessing a motor of its own. Once a system of pipes or hoses is connected, the pump can be used to convey the cooling medium water to the intended destination.

The generator generates power in accordance with the dynamo principle, which it subsequently delivers to the transformer control station present in the container and then—with the required respective nominal values—to the electrical loads, which mainly would be failed cooling water pumps.

The built-in fixtures—also referred to as components—are adapted to the performance requirements of nuclear installations, in particular to nuclear power stations and their power requirements. In this, the power capacity is chosen so that the following cases of application are covered.

At defined points in existing cooling-water lines of the nuclear installations, connecting pieces are installed, which may be sealed with shut-off and blocked manually operated valves. Connected to these points are then suction and pressure lines, which are connected to the pump, and in this manner provide a substitute for the failed cooling water pump(s). Consequently, the cooling water continues to be circulated in the cooling water cycle by the pump provided in the supply container. If no connecting pieces are present, e.g. so-called "hot taps" are installed before the components are put into operation. For this, one taps into a pressurized line and in one work operation one provides it with a connecting piece including shut-off valve. Subsequently the pump present in the supply container can be started up and the cooling cycle can be re-activated.

Provided that parts of the existing cooling-water system have suffered physical damage, water from an external water feed may be drawn in by the pump on the suction side via vacuum-proof suction hoses or pipes and may thereupon be pumped at a higher pressure via pressure hoses into a part of the intact cooling system. Prior to this, destroyed pipe sections must be shut-off and connections, such as add-on connection pieces, must be installed. The external water feed may be ocean water, river water, cooling tower basin water, pond or lake water, or an existing drinking water or process water supply network.

However, if the pumps of the cooling-water system of the nuclear installation have failed as a result of a power outage, one also has the option of operating these pumps by connecting them to the generator or transformer of the container. It is further possible to charge buffer batteries, which control the valves of the pressure control system and the associated measuring and control system.

In accordance with a further variant, the pump is operated and power is generated by the generator. This provides the following application options:
   Operation of the pump may be used to maintain a cooling cycle bypass or to maintain a cooling cycle, e.g. of the fuel element cooling basins.
   Operation of the generator may be used to reactivate/operate failed cooling-water pumps of the existing cooling water cycle.
   Operating both the pump and the generator, a cooling cycle bypass may be implemented with a simultaneous activation of the failed cooling water pumps.

The invention's supply container contains as principal components:
   a motor, such as a Diesel motor,
   a power generator,
   a pump, such as a high-performance pump, including basic pipework up to the first shut-off,
   a fuel tank,
   a transformer control station that should be radiation-protected and should posses decontamination properties.

The container further should contain as connecting and installation materials at least:
   welding equipment including welding torches, to weld connecting pieces to existing lines,
   various sets of pipe fitter tools,
   weld-on fittings and valves,
   equipment for hot tapping and pipe boring,
   connecting pieces and shut-off devices,
   calibrated Geiger counters and dosimeters, radiation protection suits, oxygen- and breathing apparatus for personal protection,
   network-independent and interference-free communications equipment.

As a further development it is intended that deployed together with the supply container be a second container, which could also be a 40 ft container or a 45 ft container. The second container should contain connecting and installation material such as
   special power cables,
   fire hoses
   couplings and accessories,
   welding equipment including welding torches,
   pipe fitter tools,
   connection fittings and valves,
   hot tapping equipment with connecting pieces and shut-off devices,
   Geiger counter, dosimeter, radiation protection suits, oxygen- and breathing apparatus,
   fuel tank,
to mention in an exemplary manner some materials or components, that altogether are used directly or indirectly in providing an emergency supply to a nuclear installation.

The invention's teaching, namely that the fuel tank is installed in the center-of-gravity section of the container, i.e. in particular in the central section, allows a safe positioning. In flooded terrain, hydraulic self-leveling telescopic supports can protect the components against water ingress.

Transport by truck, ship or via rail, by plane or by means of a helicopter is easily accomplished.

The invention's arrangement is self-contained and in the case of no proper cooling water being available to the nuclear installation for cooling the latter requires a sufficient water feed in order to ensure the cooling. The water quality is not important in this, since the pump should be embodied as a seawater-resistant wastewater pump. Due to the large holding capacity of the fuel tank, continuous operation is possible over a time period that is long enough to ensure that cooling of the nuclear installation or providing the supply of power can be maintained for a time period long enough to allow repair work to be carried out.

The container should be embodied in such a manner so that it is protected against radiation, flying debris, and explosions. Additionally integrated should be a decontamination area with a shower to be able to remove contaminated particles from personnel, if necessary.

On account of the transformer control station, it is possible to react to fluctuations in the electricity grid, whereby several power circuits can be controlled separately and the output can be matched to match the pump's requirements. During this, the transformer control station can perform a charging function for buffer batteries used for the control of the valves and MSR instruments.

Further details, advantages, and features of the invention are not only found in the claims, the characteristic features described therein, individually or in combination, but also in the following description of an embodiment example illustrated in the figures.

Figure 1:
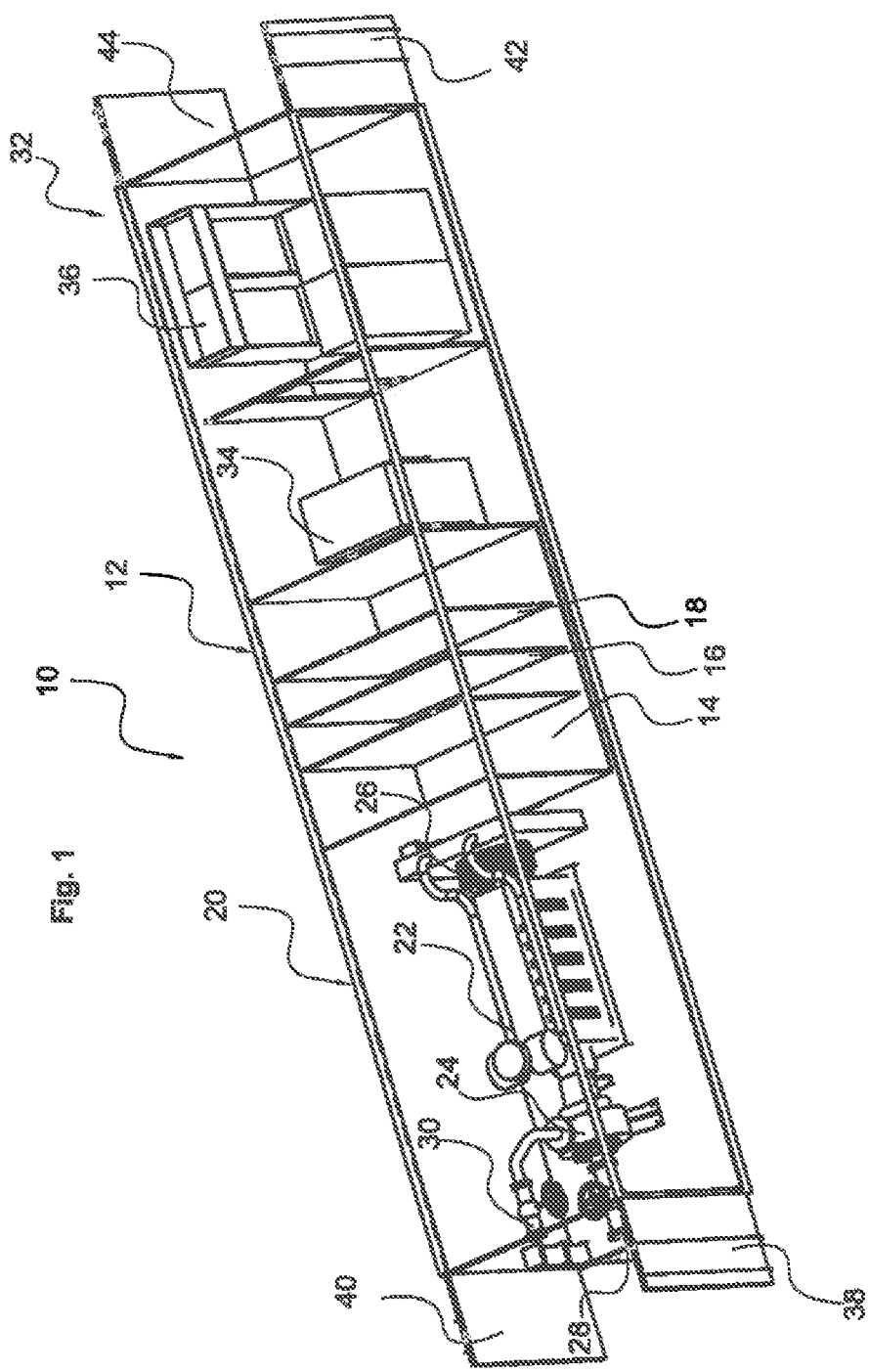
FIG. 1 shows a schematic illustration of a supply container.
Figure 2:
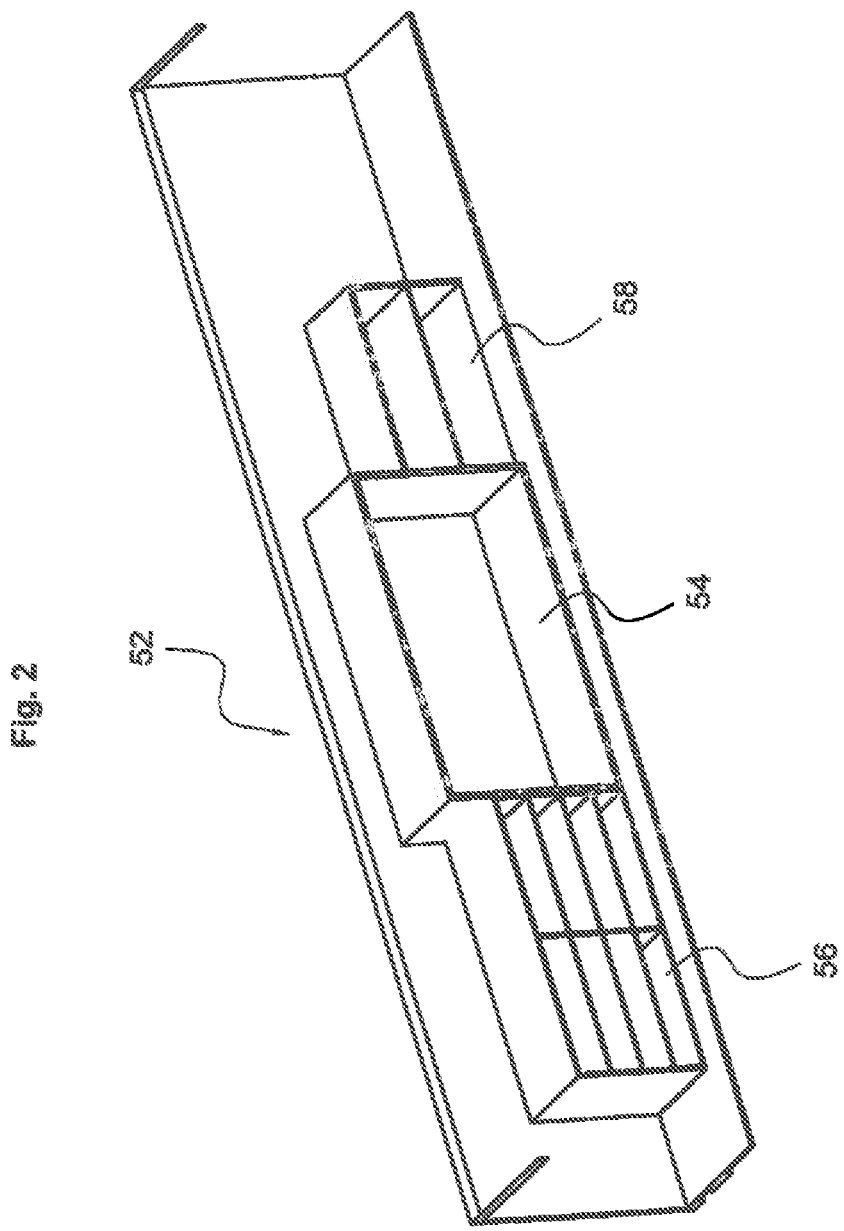
FIG. 2 shows a schematic illustration of an additional container.
Figure 3:
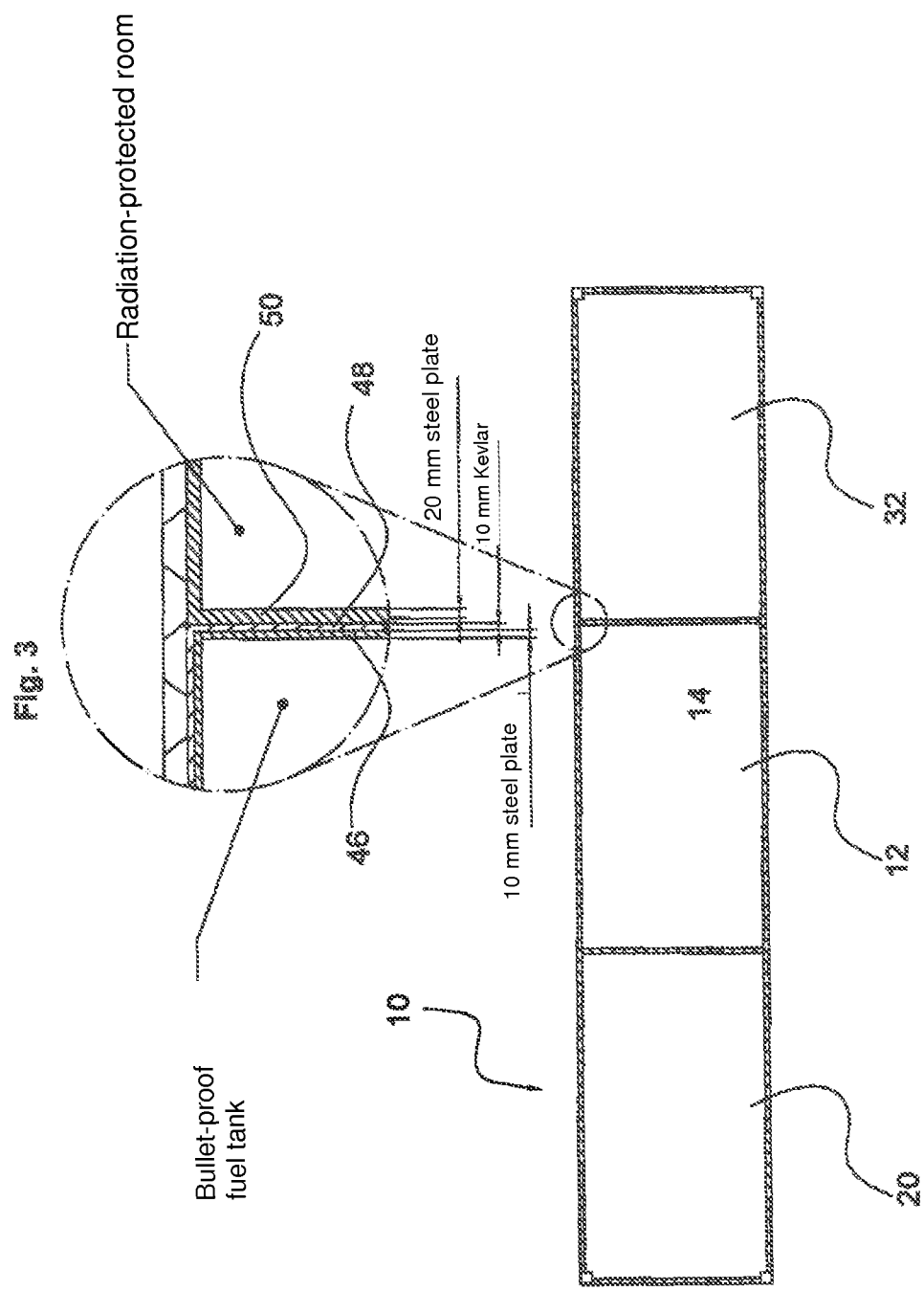
Figure 4:
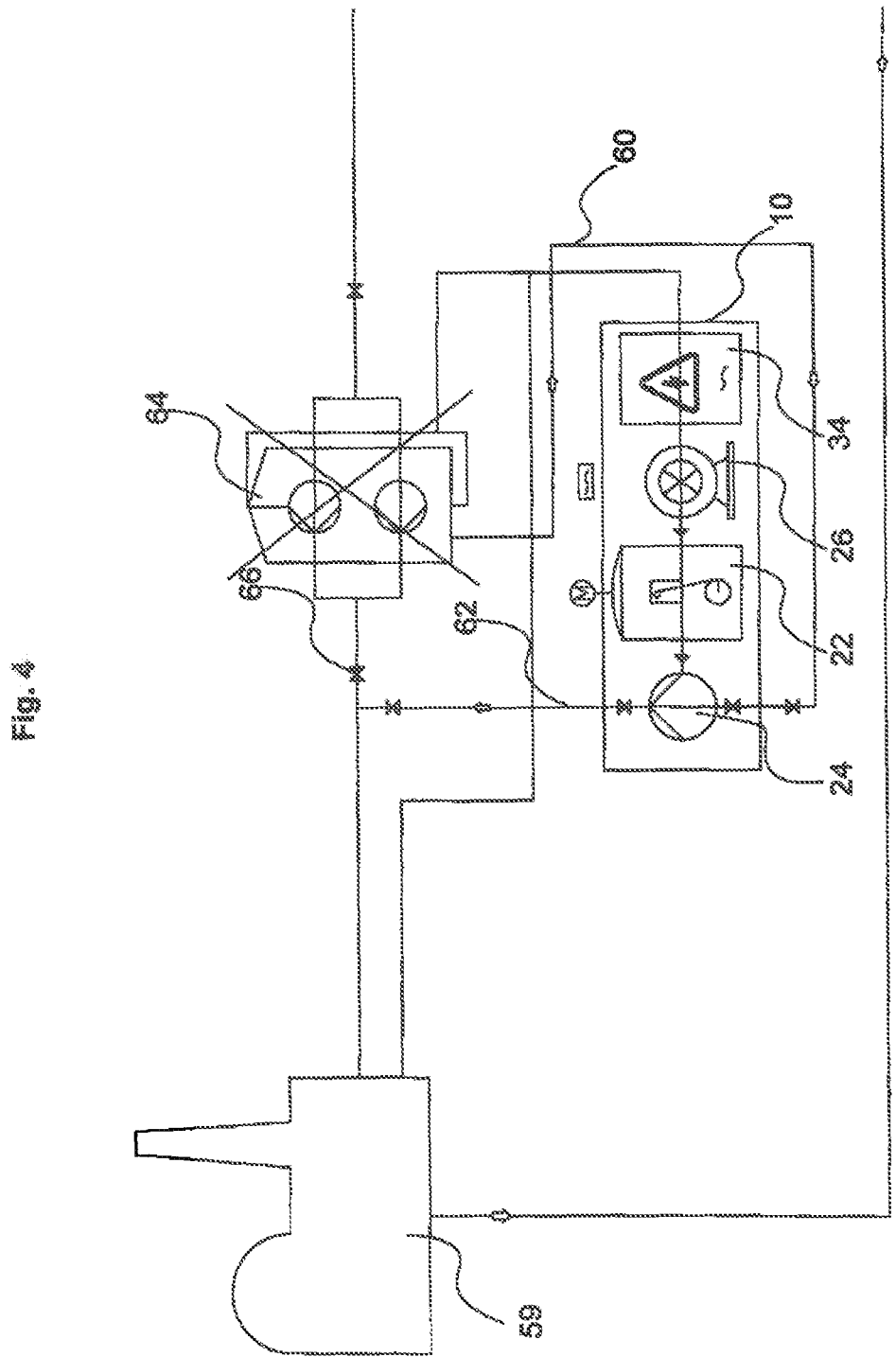
Figure 5:
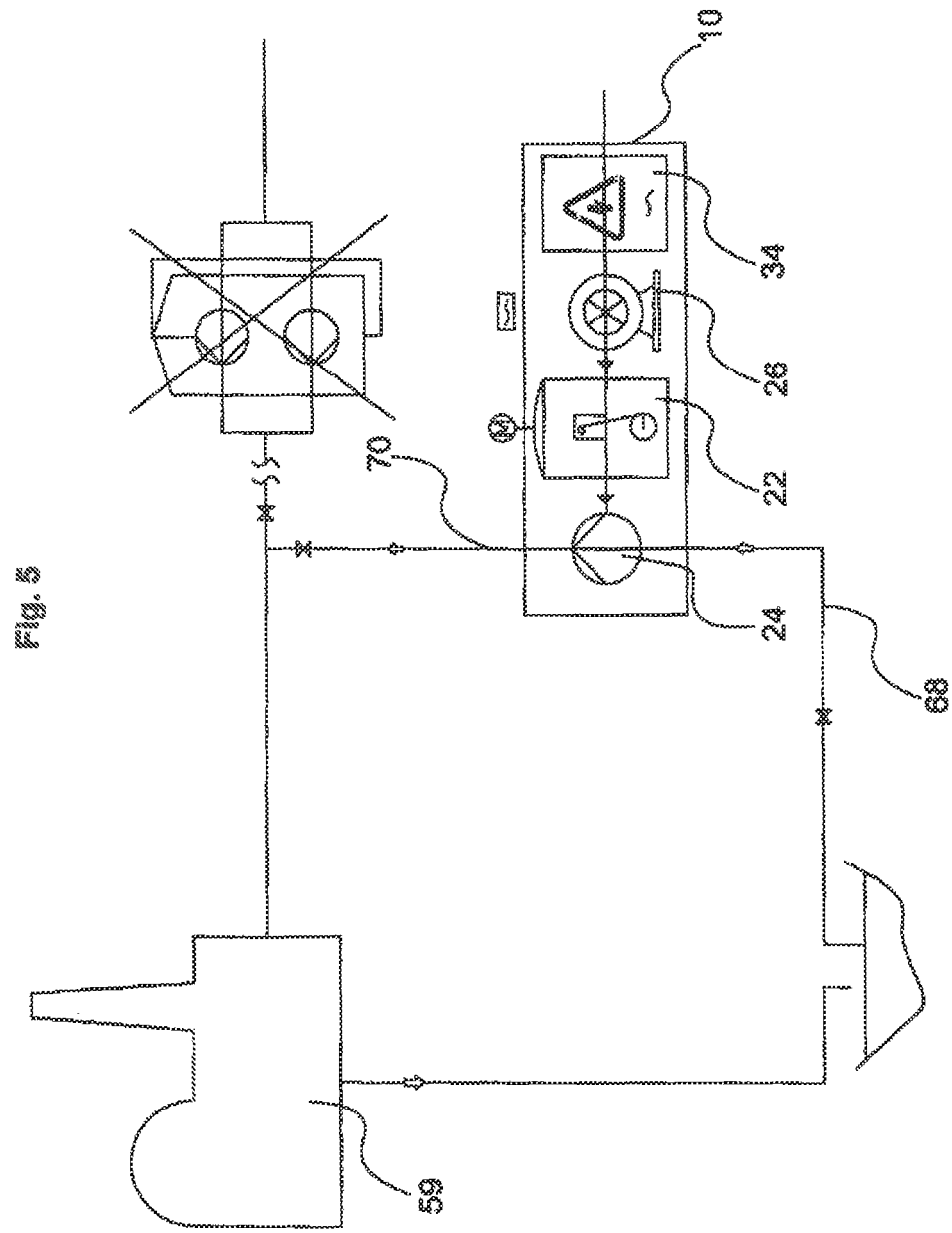

FIG. 3 shows a further schematic illustration of the supply container of FIG. 1, FIG. 4 shows a schematic illustration of a first example of the application of a supply container in accordance with the invention, FIG. 5 shows a schematic illustration of a second example of the application of a supply container according to the invention, and FIG. 6 shows a schematic illustration of a third example of the application of a supply container according to the invention.

FIG. 1 shows in a purely schematic perspective illustration a supply container 10, which can in a self-sufficient manner uphold the operation of a nuclear installation, such as a nuclear power plant, whose cooling water system has failed, either by damage to the piping network or the pumps, or because of a power outage.

The supply container 10—referred to as container hereafter—in particular is a 40 ft container that is principally subdivided into three sections. Installed in a first section 12, which should be situated in the center of gravity of the completed container 10 fully equipped with facilities, is a bullet-proof fuel tank 14, which for example may possess a minimum holding capacity of at least 10 m³, to mention a number as example. Present in the tank 14 are partition plates 16, 18, to subdivide the tank 14, i.e. its interior volume, into relaxation zones. This ensures that sloshing of the fuel during transport of the container 10 is prevented.

The illustration of FIG. 1 shows to the left of the center section 10 a second section 20, which can be referred to as machine room, and in which are arranged at least a motor 22, preferably in the form of a high-performance turbo-charged Diesel motor, a pump 24, in particular in the form of a horizontally mounted, self-priming spiral-casing pump that is designed for waste water, as well as a power generator 26. Originating from the pump 24 further are lockable suction and pressure lines 28, 30, which then can be connected in a manner described in the following to a cooling system of the nuclear installation to be supplied.

A third section 32—in the illustration located on the right of the fuel tank 14—comprises a transformer 34 as well as a radiation-protected room 36, preferably equipped with a decontamination shower.

The container 10 can be closed by hinged doors 38, 40, 42, 44 on its end walls.

FIG. 3 shows a further schematic illustration of a container 10 according to the invention, whereby the sections 10, 20, and 32 are illustrated schematically. Also illustrated is a detailed view of the tempered steel plate container wall, in particular between the bullet-proof fuel tank 14 as the central section 10 and the right-hand section 32—referred to as radiation-protected room, which contains at least the transformer 34.

The detailed drawing shows that the dividing wall between the fuel tank 14 and the radiation-protected room is composed of a steel plate 46 of e.g. 20 mm thickness on the fuel-tank side, a Kevlar plate 48 of e.g. 10 mm thickness, and a steel plate 50 of e.g. 20 mm thickness. A steel plate 50 of corresponding thickness also surrounds the third section 32, i.e. the radiation-protected room, as well as the motor room, i.e. section 20.

The 40 ft container 10 in the field of application may be accompanied by a second container 52, which can also be a 40 ft container that contains a fuel tank 54 as well as shelves 56, 58, to accommodate connecting and installation materials of the type described in the following.

Because of the large holding capacity of the fuel tank 14 or 54, one has available an emergency supply system that can operate self-sufficiently for a period of several days. If for example the fuel consumption of the motor 22 amounts to 135 liters per hour, the motor will be able to operate without interruption for at least 108 hours, if the tank 14 holds a volume of 15 m³. If the additional container 52 is available with a corresponding volume of the fuel tank 54, the total fuel reserves will be sufficient for approximately 9 days.

The fuel supply ensures that the motor 22, i.e. preferably the Diesel motor, can operate for approximately 300 hours at full load. Full load in this context means simultaneous operation of both the pump 24 and the generator 26. During partial load operation with either the pump or the generator being operated, the motor 22 can be operated at a partial load of 70% for approximately 4000 hours, i.e. approximately half a year. This ensures that a cooling system of a nuclear installation can be operated to a degree that is adequate to dissipate the decay heat, so that any endangerment of the environment can be ruled out.

With respect to the motor 22 it should be noted that it should be designed in a manner that allows operation with all liquid, petrochemical fuels or vegetable oils.

The motor 22 comprises two shaft ends, one of which is connected to the pump 24, while the other one is connected to the generator 26. The power generator 26 is connected to a transformer 34, so that electrical loads can be supplied with the adjusted rated values they require. It also becomes possible to react to fluctuations of the power grid, to control several power circuits separately, and to adjust the output to meet the requirements of pumps that are present in the nuclear installation.

The components of the container 10 are designed to match the power requirements of a nuclear installation 59 and are adapted to the power demand of said installation. In the event of an accident, the following modes of application are possible.

In the event of a failure of the cooling system of the nuclear installation 59, one has the following options. In preparation, connecting pieces can be installed at defined points of the existing cooling-water lines, which are closed using a shut-off or blocked manually operated valve. To these points are connected suction lines 60 and pressure lines 62 that are connected to the pump 24 in order to replace a failed cooling-water pump 64. Circulation of the cooling water cycle can be maintained. Accordingly, in the illustration of FIG. 4 the link between the failed pump 64 and the connecting piece, which is connected to the pressure line 62, is blocked by a shut-off valve 66.

FIG. 4 illustrates a second variant. If no connecting pieces are present, one performs hot-tapping pipe bores accordingly. Hot-tapping is the process of boring into piping under pressure, whereby a connecting piece including shut-off valve is installed in the same work step. Subsequently the pump of the emergency system can be put in service and the cooling cycle can be reactivated. The corresponding flowchart is illustrated in FIG. 4.

If parts of the existing cooling water cycle of the nuclear installation 59 have been destroyed, the suction side of the pump 24 is connected to an external water feed (line 68). This can be ocean water, river water, pond or lake water, or the existing drinking or industrial water supply network of the nuclear installation 59 or of a community. The pump 24 increases the intake water pressure, which is then delivered via pressure hoses 70 into the intact cooling system of the nuclear installation 59. Prior to this, the destroyed line section is blocked and a tap fixture is placed for connections.

A further variant is illustrated in FIG. 6. After a power-related failure of a still intact pump 72, this pump is supplied with power by the transformer controller 36, without the need for the pump 24 of the container 10 itself having to convey the cooling water.

To summarize:
1. The container 10 should contain as main components:
   a motor 22,
   a power generator 20,
   a pump 24 with basic pipework,
   a fuel tank 14,
   a radiation-protected transformer or transformer control station 34, possibly with a decontamination area 36 with shower.
2. As original or basic equipment the following should also be available in the container 10:
   welding equipment including welding torches, to weld connecting pieces to existing piping,
   pipe fitter tools,
   connecting fittings and valves, in particular with a nominal width in accordance with DIN 100,
   equipment for hot-tapping and installing connecting pieces including connecting pieces and shut-off valves,
   calibrated Geiger counters and dosimeters,
   radiation protection suits, oxygen and breathing apparatus,
   network-independent and interference-free communications devices.
3. The second container 52, which may also be embodied as a 40 ft container, should contain the following connecting and installation materials:
   special power cables to bring failed pumps back to service,
   robust fire-fighting hoses with couplers and accessories, either to re-activate existing cooling systems or to import water into the nuclear installation in an autonomous manner (vacuum-tight suction pipes or hoses),
   welding equipment including welding torches, to weld connecting elements to existing piping,
   pipe fitter tools,
   weld-on fittings and valves, in particular with a nominal width according to DIN 100,
   equipment for hot-tapping and installing connecting pieces, with connecting pieces and shut-off valves,
   calibrated Geiger counters and dosimeters,
   radiation protection suits,
   oxygen and breathing apparatus for personal protection purposes,
   a fuel tank with a holding capacity of at least 10 m$^3$, preferably 15 m$^3$,
   other consumables.

The invention's system is self-contained and for its operation requires an adequate water feed. The water quality is irrelevant in this, since it is intended to employ a saltwater-resistant wastewater pump 24. The quantity of fuel to be stored in the container(s) 10, 52 should be dimensioned so that a continuous operation without refueling is possible for many days.

The invention's intended field of application is the failed cooling cycle of a nuclear installation, and the reactivation of this cooling cycle, so that it can be ensured that the heat of decay can be dissipated.

This is in particular achieved by replacing or re-enforcing the existing cooling water cycle and/or by bridging the electrical circuit in order to bring failed cooling water pumps back into service.

The container or containers 10, 52 in particular should be protected against radiation, flying debris, and explosives. Also integrated should be a decontamination shower to be able to remove contaminated particle from persons. The transformer control station can react to fluctuations of the power-supply network, can control several power circuits separately, and match the output to meet the pump's requirements. The transformer control station further can act as a charger for the buffer batteries for the control of the valves and MSR instruments. It is variable and can be adjusted to the required nominal values.

The container 10, 52 is mobile and consequently location-independent, self-sufficient, robust, and does not require any structural connections. A simple mechanical and compact design ensures low fault susceptibility and that on principle the unit can be deployed all over the world. Application outside of nuclear installations is also possible, e.g. deployment in disaster areas, in which power, water/drinking water, wastewater treatment, and heat are needed. The components can be adapted to the objectives of the deployment, i.e. the container can be equipped accordingly.

The invention claimed is:

1. A method of providing an emergency supply of services to a nuclear power plant having a cooling water cycle, the method comprising:
   situating a container at a remote location from the power plant, wherein the container has permanently integrated therein:
   a motor comprising a first shaft and a second shaft;
   a generator driven by the first shaft;
   a pump driven by the second shaft;
   a fuel tank connected to the motor, and supplying fuel to the motor; and
   a transformer connected to the generator;
   connecting the pump to the cooling water cycle of the nuclear power plant;
   using the pump to pump water from an external water feed into the cooling water cycle of the nuclear power plant.

2. The method according to claim 1, comprising connecting the transformer to a transformer controller, via which a power source is supplied in the nuclear power plant.

3. The method according to claim 2, comprising providing a battery as the power source.

4. The method according to claim 1, comprising locating the fuel tank in a region of the center of gravity of the container.

5. The method according to claim 1, comprising providing a Diesel motor as the motor.

6. The method according to claim 5, comprising providing a turbocharged diesel motor as the Diesel motor.

7. The method according to claim 1, comprising providing a self-priming pump as the pump.

8. The method according to claim 7, comprising configuring the self-priming pump to pump waste water.

9. The method according to claim 7, comprising providing a spiral casing pump as the self-priming pump.

10. The method according to claim 1, comprising providing a fuel tank having a holding capacity of at least 10 $m^3$ as the fuel tank.

11. The method according to claim 1, comprising providing a fuel tank having a holding capacity of at least 15 $m^3$ as the fuel tank.

12. The method according to claim 1, wherein the fuel tank is lined with a plate made from KEVLAR® fiber.

13. The method according to claim 1, wherein the fuel tank comprises relaxation zones formed using partition plates.

14. The method according to claim 1, further comprising providing the container with a decontamination area having a shower.

15. The method according to claim 14, comprising arranging the motor, the generator, and the pump on one side of the fuel tank; and arranging the transformer and the decontamination area on an opposing side of the fuel tank.

16. The method according to claim 1, comprising providing a container having a length of at least forty feet as the container.

17. The method according to claim 1, comprising providing the container with walls made of tempered steel plate.

18. The method according to claim 1, comprising locating the fuel tank in a central region of the container.

* * * * *